J. E. KRUMM.
DEVICE FOR FASTENING TEETH IN CYLINDERS AND CONCAVES OF GRAIN AND SEED THRESHERS.
APPLICATION FILED FEB. 16, 1911.
1,148,909. Patented Aug. 3, 1915.
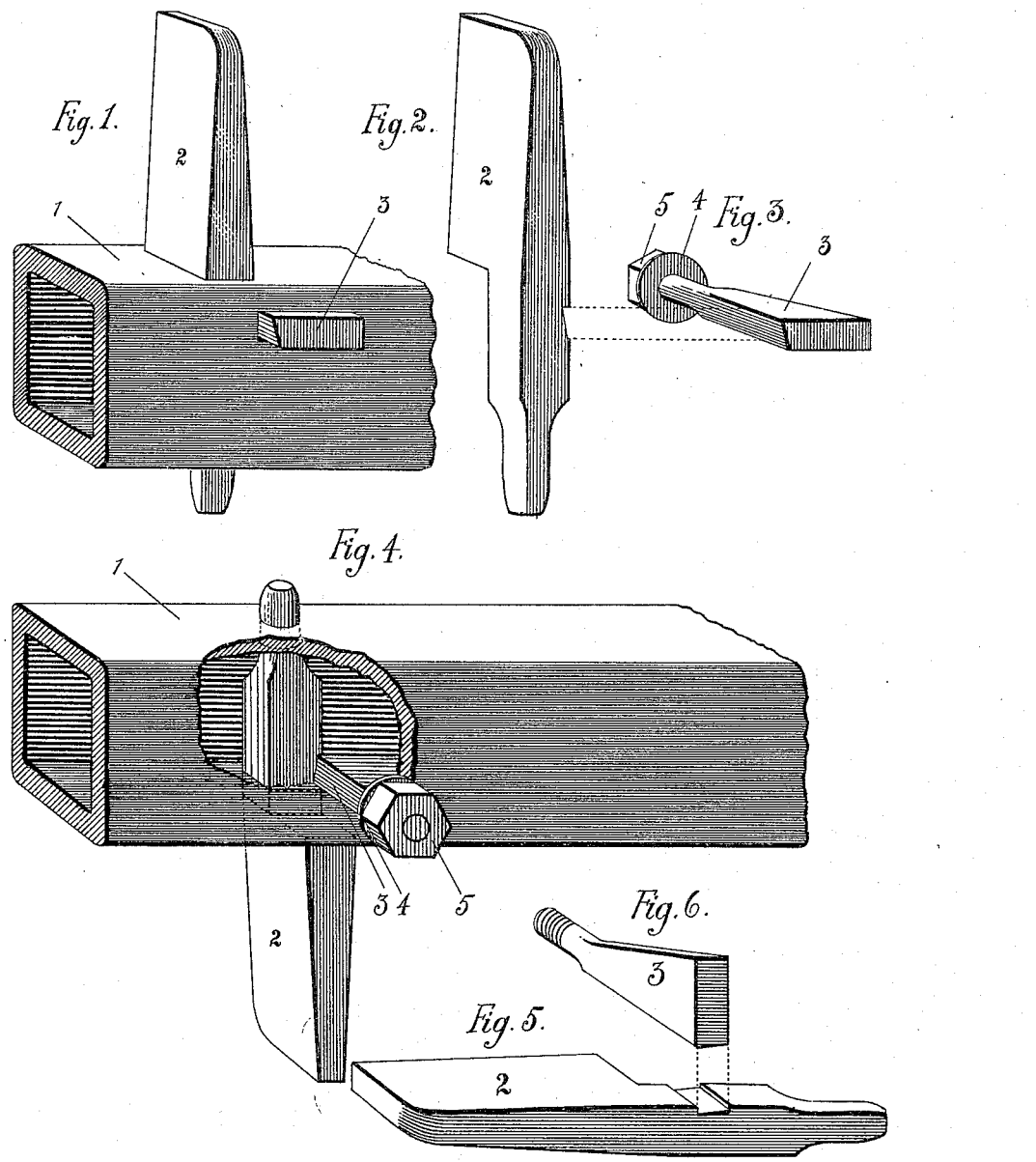

UNITED STATES PATENT OFFICE.

JOHN E. KRUMM, OF TURBOTVILLE, PENNSYLVANIA.

DEVICE FOR FASTENING TEETH IN CYLINDERS AND CONCAVES OF GRAIN AND SEED THRESHERS.

1,148,909.  Specification of Letters Patent.  Patented Aug. 3, 1915.

Application filed February 16, 1911. Serial No. 609,032.

*To all whom it may concern:*

Be it known that I, JOHN E. KRUMM, a citizen of the United States, residing at Turbotville, in the county of Northumberland and State of Pennsylvania, have invented a new and useful Device for Fastening Teeth in Cylinders and Concaves of Grain and Seed Threshers, of which the following is a specification.
My invention relates to an improvement in the manner of fastening teeth in cylinders and concaves of grain and seed threshers, and all other machines using cylinders and concaves with teeth; and the objects of my improvement are, first, to fasten the teeth more securely to the bar; second, to reduce the tendency of teeth to loosen to a minimum; third, to provide more convenient access to the parts in removing and replacing broken, damaged or worn out teeth; fourth, to provide a means by which a tooth set close to the head of a cylinder or band thereof may be inserted or removed as easily and quickly as a tooth in any other part of the bar; and, fifth, to simplify the task and economize time in removing and replacing broken, damaged or worn out teeth.

I attain these objects by the device illustrated in the accompanying drawing, in which—

Figure 1 is a perspective view of a piece of a cylinder bar, tooth and wedge-bolt in position as when in use; Fig. 2, a tooth removed from the cylinder bar, but in same relative position as in Fig. 1; Fig. 3, wedge-bolt with nut and washer, removed from cylinder bar, but in the same relative position as in Fig. 1; Fig. 4, a view of the back or reverse side of Fig. 1, with portion of bar broken away to show the relation of parts on the inside of the bar; Fig. 5, another view of tooth shown in Fig. 2, showing recess in side of shank against which wedge-bolt fits; and Fig. 6, another view of wedge-bolt moved upward from Fig. 5, but otherwise in the proper relative position for fitting thereto.

Similar numbers refer to similar parts throughout the several views.
The various parts are assembled for use and held in position in the following manner: The cylinder or concave bar 1, has at each place where a tooth 2 is to be fastened, a rectangular opening on one side and a round opening on the opposite side, as shown by dotted lines in Fig. 4, to receive the part of shank of tooth having corresponding shapes. Tooth 2 is inserted into bar 1, as shown in Fig. 1 and Fig. 4. Wedge-bolt 3 is next placed in position at right angles to shank of tooth and transversely to the length of the bar, as shown in Fig. 1 and Fig. 4, bar 1 having a rectangular opening and a round opening to receive correspondingly-shaped parts of same. Washer 4, which may be either the ordinary one shown or the steel spring kind, and nut 5 are next placed in position and drawn up as shown in Fig. 4.

Wedge-bolt 3 is made of such shape that, due to its varying width, when drawn up it has the action of a wedge between one end of rectangular opening in bar 1 and the recess in shank of tooth 2. It is not intended that the recess or depression in shank of tooth 2 shall be of exactly the same shape and proportions as shown in the drawing, but, like all other parts of the whole device, each piece is to be made of such shape and size as to give necessary strength and desired results in practice.

To remove a tooth, it is only necessary to loosen nut 5, tap wedge-bolt 3 a little backward with a hammer, and withdraw tooth 2. To replace a tooth, drive it into position in bar as shown, draw up wedge-bolt 3 by means of nut 5, and it is securely held in place.

The following advantages are to be gained in the use of the above device over the method of fastening teeth in cylinders and concaves in common use: First, convenience of access to the parts. The nuts being on the side of the bar instead of underneath, no special wrench is needed to manipulate them, but they are easily accessible with an ordinary wrench, and may be gotten into a position so that a person can see to work at them. Second, a great saving of time and lessening of labor in removing and replacing teeth.
Third, teeth set closely to cylinder head or bands are as convenient to fasten or loosen as any others.

I claim:

1. In a threshing machine cylinder the combination of a hollow tooth bar provided with apertures for receiving a threshing tooth and its locking means, a shouldered threshing tooth adapted to engage certain of said apertures, and provided with a laterally extending notch in its shank, locking means for the said tooth comprising a wedge provided with a screw threaded shank, slidably located in certain of the said apertures and adapted to engage the laterally extending notch and a nut upon the threaded shank of the wedge whereby the said wedge can be forced into engagement with the said notch and retained in engagement therewith substantially as and for the purposes set forth.

2. In a threshing machine cylinder the combination of a hollow tooth bar provided with apertures for receiving a threshing tooth and its locking means, a shouldered threshing tooth adapted to engage certain of said apertures, and provided with a notch in its shank, locking means for the said tooth comprising a wedging bolt provided with a screw threaded shank, in certain of the said apertures and adapted to engage the notch in said shank of tooth whereby the said tooth is held in a stationary position.

JOHN E. KRUMM.

Witnesses:
ROSCOE S. BLAINE,
HENRY J. SNYDER.

Copies of this patent may be obtained for five cents each, by addressing the "Commissioner of Patents, Washington, D. C."